(12) United States Patent
Hackmann (10) Patent No.: US 7,836,065 B2
(45) Date of Patent: Nov. 16, 2010

(54) SEARCHING MULTIPLE REPOSITORIES IN A DIGITAL INFORMATION SYSTEM

(75) Inventor: Herbert Hackmann, Wiesloch (DE)

(73) Assignee: SAP AG, Walldorf (DE)

( * ) Notice: Subject to any disclaimer, the term of this patent is extended or adjusted under 35 U.S.C. 154(b) by 921 days.

(21) Appl. No.: 11/264,561

(22) Filed: Nov. 1, 2005

(65) Prior Publication Data

US 2007/0100868 A1    May 3, 2007

(51) Int. Cl.
G06F 17/30    (2006.01)
(52) U.S. Cl. ...................................................... 707/758
(58) Field of Classification Search .................. None
See application file for complete search history.

(56) References Cited

U.S. PATENT DOCUMENTS

| | | | |
|---|---|---|---|
| 4,823,306 A | 4/1989 | Barbic et al. | |
| 6,564,212 B2 | 5/2003 | Koskas | |
| 6,711,563 B1 | 3/2004 | Koskas | |
| 6,850,934 B2 | 2/2005 | Bates et al. | |
| 6,886,011 B2 | 4/2005 | Beauchamp | |
| 7,334,216 B2 * | 2/2008 | Molina-Moreno et al. | 717/109 |
| 7,555,490 B1 * | 6/2009 | Neal | 707/102 |
| 2004/0143644 A1 | 7/2004 | Berton et al. | |
| 2004/0267721 A1 * | 12/2004 | Meyerzon et al. | 707/3 |
| 2005/0091197 A1 | 4/2005 | Dettinger et al. | |

* cited by examiner

*Primary Examiner*—James Trujillo
*Assistant Examiner*—Fatima P Mina
(74) *Attorney, Agent, or Firm*—Fish & Richardson P.C.

(57) ABSTRACT

A computer-implemented method of configuring a database system for a global attribute search may include receiving a first user-actuated input in a distributed computing system that comprises multiple executable software applications. The software applications may process data objects in the system, and the data objects may have attributes and corresponding attribute values that are stored in two or more attribute repositories of an attribute system. The first user-actuated input may identify a user-selected attribute having an attribute name. The computer-implemented method may receive a second user-actuated input that identifies a user-determined alias name. The computer-implemented method may store in the attribute system an association between the user-determined alias name and the user-selected attribute name, such that during execution of a global search of attributes in the two or more attribute repositories, the attribute system may provide the user-selected attribute name in response to query input comprising the user-determined alias name.

9 Claims, 9 Drawing Sheets

ALIAS MAPPING TABLE

| ALIAS | ATTRIB₁ | ATTRIB₂ | ATTRIB₃ | ... |
|---|---|---|---|---|
| PHYSICIAN | PRIMARY CARE PROVIDER | REFERRING PHYSICIAN | DOCTOR | ... |
| PATIENT | PATIENT | PATIENT NAME | RESPONSIBLE PARTY | ... |
| ... | ... | ... | ... | ... |

- 403 ALIAS
- 407 ATTRIB₁
- 410 ATTRIB₂
- 413 ATTRIB₃
- 416, 419, 422, 425

SEARCHING MULTIPLE REPOSITORIES IN A DIGITAL INFORMATION SYSTEM

TECHNICAL FIELD

This document generally relates to searching in a plurality of repositories in a digital information system for data objects that have an attribute with an attribute value corresponding to a search value.

BACKGROUND

Various entities may use digital information systems to manage information of all kinds. For example, a manufacturing company may use an enterprise resource planning (ERP) system to manage its inventory, manufacturing schedules, and product orders. The manufacturing company may use the same system to manage contact information, such as employee, customer and vendor information; accounting information, such as payroll, customer invoices and vendor payments; and sales information, such as completed sales, sales forecasts, region sales summaries, and so on. As another example, a group of physicians may use a digital information system to manage patient medical information. The patient medical information may include patient demographic information; scanned notes from physicians, taken during consultations with or examinations of the patient; lab results from any tests or analyses, such as tests of blood or tissue; images that may have been captured, such as x-rays, MRIs (magnetic resonance images), CAT scans (computer-aided tomography), and so. The group of physicians may also use the digital information system to track accounting information, such as payroll, patient invoices and payments, insurance invoices and payments, lab charges, and so on.

Digital information systems may be implemented on a single computer, or on a networked system of computers distributed throughout one building, several buildings, or buildings all over the world. The digital information system may include many different software components. The software components may be provided by a single company or by many different companies. Further, a digital information system may be implemented in various phases. For example, the software components may be designed and coded in a "design" phase. The software components may be integrated during a "configuration" phase of implementation. During the configuration phase, various components may be selected and configured to work together and within a specific system of computer hardware or within a specific network. Also during this configuration, various parameters of the software components may be set in order to implement a digital information system that implements the desired functions. For example, referring to the group of physicians described above, various generic, off-the-shelf ERP software components may be selected and configured, during a configuration phase, to work together and within the group's computer network to implement a system for managing patient medical information. During a "runtime" phase, programming code in the software components may be executed by one or more computer devices or systems to perform functions on the information within the system.

The digital information system may provide various methods of searching for information. Each method may balance different design parameters. For example, a full-text search of information stored in the digital information system may require a large amount of memory and a relatively long period of time to complete. A more focused search may take less time to complete but may be under-inclusive.

SUMMARY

This document generally relates to searching in a plurality of repositories in a digital information system for data objects that have an attribute with an attribute value corresponding to a search value. In some embodiments, the digital information system may include an alias mapping table that associates an alias name with two or more attribute names. In some embodiments, the digital information system may associate an alias name with an attribute by specifying the alias name in metadata of the attribute.

The system may receive search input comprising an alias name and a search value.

The system may identify attribute names associated with the received alias name, and may search the data objects for a data object having an attribute that has one of the identified attribute names and that further has an attribute value corresponding to the search value. In some embodiments, the system may search for data objects having multiple attributes that correspond to multiple search values.

In one general aspect, a computer-implemented method of configuring a database system for a global attribute search may include receiving a first user-actuated input in a distributed computing system that comprises multiple executable software applications. Each executable software application may process data objects that are stored in the distributed computing system, and the data objects may have attributes and corresponding attribute values that are stored in two or more attribute repositories of an attribute system. The first user-actuated input may identify a user-selected attribute having an attribute name. The computer-implemented method may receive a second user-actuated input. The second user-actuated input may identify a user-determined alias name. The computer-implemented method may store in the attribute system an association between the user-determined alias name and the user-selected attribute name, such that during execution of a global search of attributes in the two or more attribute repositories, the attribute system may provide the user-selected attribute name in response to query input comprising the user-determined alias name and may provide the user-determined alias name in response to reverse-query input comprising the user-selected attribute name.

In some embodiments, storing the association between the user-determined alias name and the user-selected attribute name may include storing the user-determined alias name and the user-selected attribute name in a row of a relational database table. In some embodiments, storing the association between the user-determined alias name and the user-selected attribute name may include storing the user-determined alias name as a metadata element of an attribute having an attribute name that corresponds to the user-selected attribute name.

In some embodiments, the computer-implemented method may further include displaying a list of alias names. The second user-actuated input may be received in response to the displayed list of alias names. The query input may further include a search value.

In some embodiments, the attribute system may further provide an identifier for a data object that has an attribute value corresponding to the search value and an attribute name that corresponds to the alias name. The computer-implemented method may further include receiving third user-actuated input that identifies an additional user-selected attribute having an additional attribute name. An additional association between the user-determined alias name and the additional attribute name may be stored in the attribute system, such that during execution of the global search of attributes in the two or more attribute repositories, the attribute system provides the user-selected attribute name and the additional attribute name in response to query input comprising the user-determined alias name and provides the user-determined alias name in response to reverse-query input comprising the additional attribute name.

In another general aspect, a computer-implemented method of performing a global attribute search may include receiving search input during execution of a global attribute search in a distributed computing system. The distributed computing system may include multiple executable software applications, each of which processes data objects having data object identifiers and being stored in the distributed computing system. The data objects may have attributes with attribute names and corresponding attribute values that may be stored in two or more attribute repositories of an attribute system. The attribute system may further store one or more alias names and an association for each alias name. The association for each alias name may associate the alias name with two or more attribute names. The search input may include a target alias name. The computer-implemented method may further include identifying two or more attribute names corresponding to the target alias name and providing output in response to the search input. The output may include the identified two or more attribute names.

In some embodiments, the two or more attribute names may be different. The search input may further include a search value. The computer-implemented method may further include identifying a data object identifier corresponding to a data object having an attribute that has one of the two or more identified attribute names and that further has an attribute value corresponding to the search value. Additional output that includes the identified data object identifier may be provided in response to the search input. The additional output may be provided by being displayed on an electronic display device. The search input may be received from one of the multiple executable software applications.

In some embodiments, the association for each alias name may be a row in a relationship database table, wherein the row includes at least the alias name and attribute names corresponding to the two or more associated attribute names. In some embodiments, the association for each alias name may be made by a metadata element of each of two or more attributes having, respectively, the two or more identified attribute names. The metadata element may identify the alias name.

Advantages of the systems and techniques described herein may include any or all of the following. Searches may be completed efficiently and quickly. Multiple repositories may be searched in sequence or in parallel. Searches may utilize fewer information system resources.

The general and specific aspects may be implemented using a system, a method, or a computer program, or any combination of systems, methods, and computer programs. The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION OF EXEMPLARY EMBODIMENTS

Figure 1:
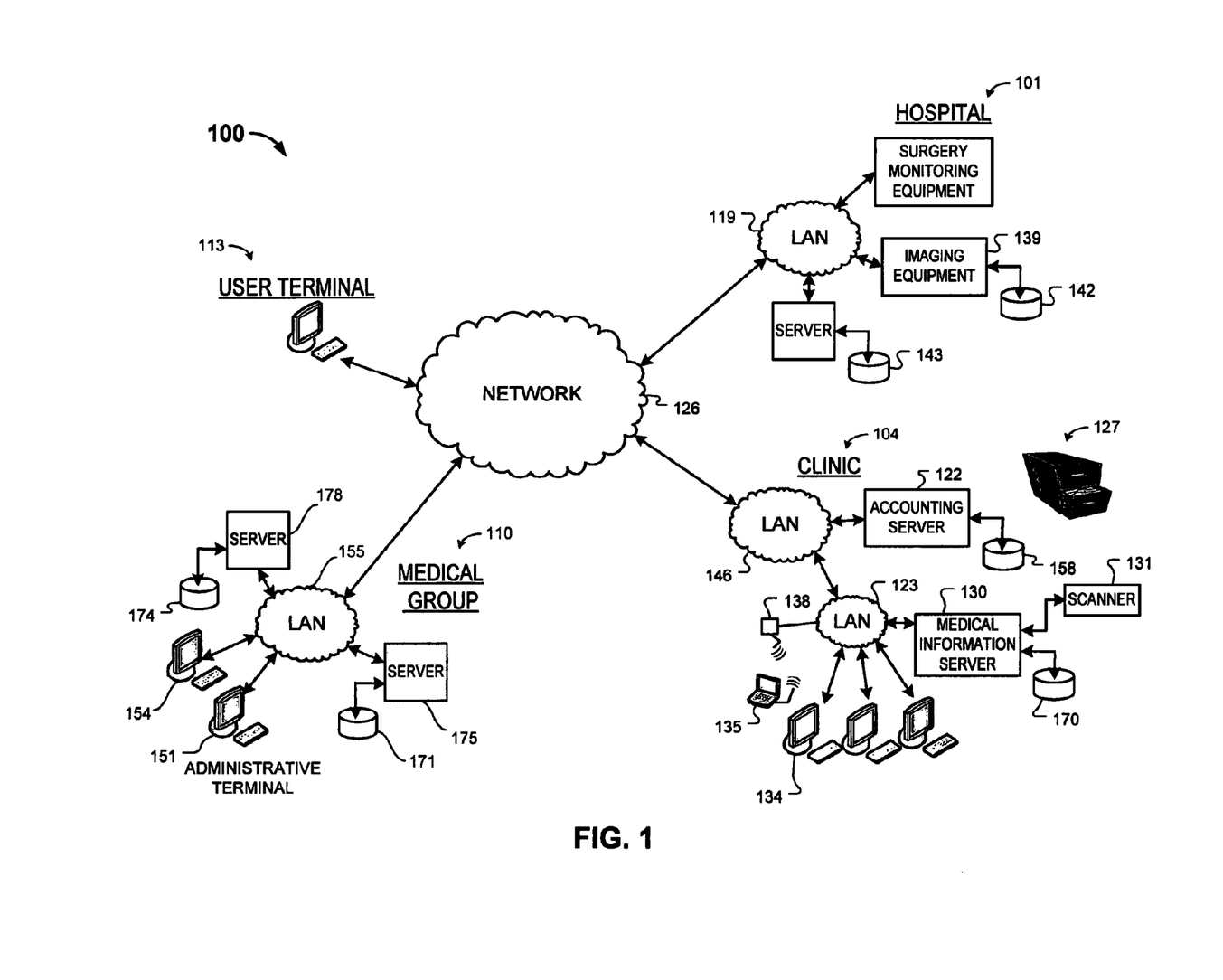
FIG. 1 is a diagram showing a physical arrangement of an exemplary system in which an alias mapping table may be used to facilitate an attribute search in multiple data object repositories, according to some embodiments.

FIG. 1 is diagram showing a physical arrangement of an exemplary system 100 in which an alias mapping table may be used to facilitate an attribute search in multiple data object repositories. As shown, the exemplary system 100 is a network of entities that may be associated with the provision of medical services. In some embodiments, the alias mapping table may be used to locate various information related to the provision of medical services.

The exemplary system 100 includes a hospital 101, a clinic 104, a medical group 110, and a user terminal 113. As will be described in more detail below, various kinds of information may be created and stored in different formats throughout the provision of medical services. For example, each kind of information may be represented by a data object of some kind (e.g., a computer file created by an application and containing information that may include information input by a user of the computer). Each data object may hold various kinds of content, and various attributes may be associated with the data object and with different aspects of the data object's content. Attributes may include parameters that affect how data objects are processed, or attributes may provide information about the data objects themselves. For example, in the exemplary environment 100, a data object may include an MRI image, and attributes of the MRI image may provide information about the MRI image, such as, for example, a patient from whom the image was taken, a referring physician, a date associated with the MRI image, and so on. An exemplary system in which information, data objects, and attributes are maintained is now described.

Various entities in the system 100 may maintain one or more local area networks (LANs). For example, the hospital may maintain a LAN 119; the clinic 104 may maintain one primary LAN 146 and a sub-network LAN 123; and so on. The LANs of the various entities may connect to a central network 126. The central network 126 may be, for example, a private network, a metropolitan area network (MAN), or the Internet. Regardless of its exact type or topology, the network 126 may permit the various other entities to communicate with each other. Communication may take many forms. For example, the entities may communicate by electronic mail (email), with a file transfer protocol (FTP), or with a virtual private network (VPN). The content of the communication may be in any format, such as text, images, video, etc.

Within the exemplary system 100, a patient may receive medical services to diagnose and treat a medical problem. For example, a patient may see his or her primary physician at the clinic 104. The primary physician may initially examine the patient in an examining room. The examining room may be equipped with a computer terminal through which the primary physician may access at least some of the patient's medical records for review or to add new medical information. Medical records for the patient may be stored in paper files 127, or in digital format, for example, on a medical information server 130. In some embodiments, clinic personnel may use a scanner 131 to import paper files 127 into the medical information server 130, such that they are accessible from the computer terminal in the examining room. The computer terminal may be, for example, a hardwired computer terminal 134 that is connected to a network 123. As another example, the computer terminal may be a wireless device 135 that accesses the medical information server 130 through a wireless access point 138 and the network 123. Based on the initial examination, the primary physician may order further testing for the patient. For example, the primary physician may determine that further diagnosis requires various magnetic resonance images (MRIs). These images may be captured at the hospital 101.

At the hospital 101, the patient may have the MRIs taken on MRI imaging equipment 139. The images may be taken and stored in a digital format. They may be stored in a storage device 142 that is connected to or integrated with the imaging equipment 139, or the images may be stored in another storage device, such as networked storage 143 that is accessible through the local network 119 that is maintained by the hospital. The MRIs may be interpreted at the hospital, for example, by a radiology department. The MRIs may also be provided to the doctor. For example, the MRIs may be electronically transmitted to the medical information server 130 at the clinic, via the hospital's LAN 119, the central network 126, and the clinic's LANs 122 and 123. From the medical information server 130, the doctor may view the MRIs.

In the course of diagnosis and treatment, other physicians may review the patient's medical records. For example, the primary physician may be part of a medical practice group (graphically depicted as the medical group 110). Another physician, such as a reviewing physician in the medical practice group, may review the patient's medical records, for example, from the computer terminal 154. More particularly, the reviewing physician may access the patient's medical records that are stored in the medical information server 130, via the medical group's LAN 155, the central network 126, and the networks 146 and 123 of the clinic.

Each of the medical services provided in the course of diagnosis and treatment may be billed. Various systems may be involved in the billing and payment process. For example, each entity may maintain its own billing system. The billing system of the clinic 104, for example, may include an accounting server 122 and an accounting database 158. Various paper records may also be maintained in paper files 127 for billing purposes.

To manage the myriad of information associated with providing medical services to patients, the medical group 110 may utilize an information management system. An exemplary information system is described in detail with reference to FIG. 2. The information management system may take many forms. In some embodiments, it may include various modules and components that are installed and executed by different devices in the system 100. For example, an exemplary information management system may include components in one or more databases, such as the databases 158, 170, 171, and 174; various servers, such as the servers 122, 130, 175, 178; and various display terminals, such as the terminals 134, 135, and 154. Moreover, the information management system may include an administrative terminal 151 through which various components, databases, and information may be integrated, configured and maintained. Further, a user may be able to access some information in the information management system from a user terminal 113.

An exemplary information management system may include various components that allow it to communicate over various networks, such as the LANs 155, 146 and 123, and over the central network 126. Further, the information management system may include components that enable it to securely connect to, and exchange information with, various other systems, such the systems of the hospital 101, the clinic 104, the medical group 110, and the user terminal 113.

The information management system may be provided by a single software provider, or it may be a complex amalgamation of components from various software providers. Moreover, the information management system may be implemented in various stages. Various exemplary stages of implementing the information management system are now described.

In some embodiments, the first stage of implementation of an information management system may include initial design of the components. That is, the function of the components vis-à-vis other components in an overall operating environment may be defined in a planning or "design stage." In this design stage, the processing steps a component is to perform may be defined, as well as any interfaces the component is to provide, and parameters that the component is to receive as input or provide as output. In some embodiments, this design information may be captured in a design document.

In some embodiments, a second stage of implementation may be a "coding stage," in which individual components may be implemented in actual programming code. At this stage, the programming code may be an intermediate programming code. For example, the programming code may be high-level code like ABAP, C++, or Java that must be compiled or interpreted prior to being able to cause a processor to perform particular tasks, which, together, may implement a function or method.

In some embodiments, a third stage of implementation may be a "configuration stage," in which various components may be configured and integrated to form a specific information management system. For example, a software provider, such as SAP AG, may provide various information management system components that may be used to implement information management systems for any industry, company or organization. In the configuration stage, the various components may be configured and integrated to implement a specific information management system on specific hardware devices. By way of example, various components such as SAP Web Application Server, SAP Enterprise Portal, SAP Master Data Management, SAP Visual Composer and SAP Solution Manager may be integrated and configured to provide an information management system for the exemplary system 100.

In some embodiments, a fourth stage may be "runtime," during which the various configured components cause one or more computer processors to execute instructions that implement various aspects of the information management system. For example, in a runtime stage of the exemplary system 100 described above, a reviewing physician may access a patient's medical records that are stored in various devices throughout a physical network.

Figure 2:
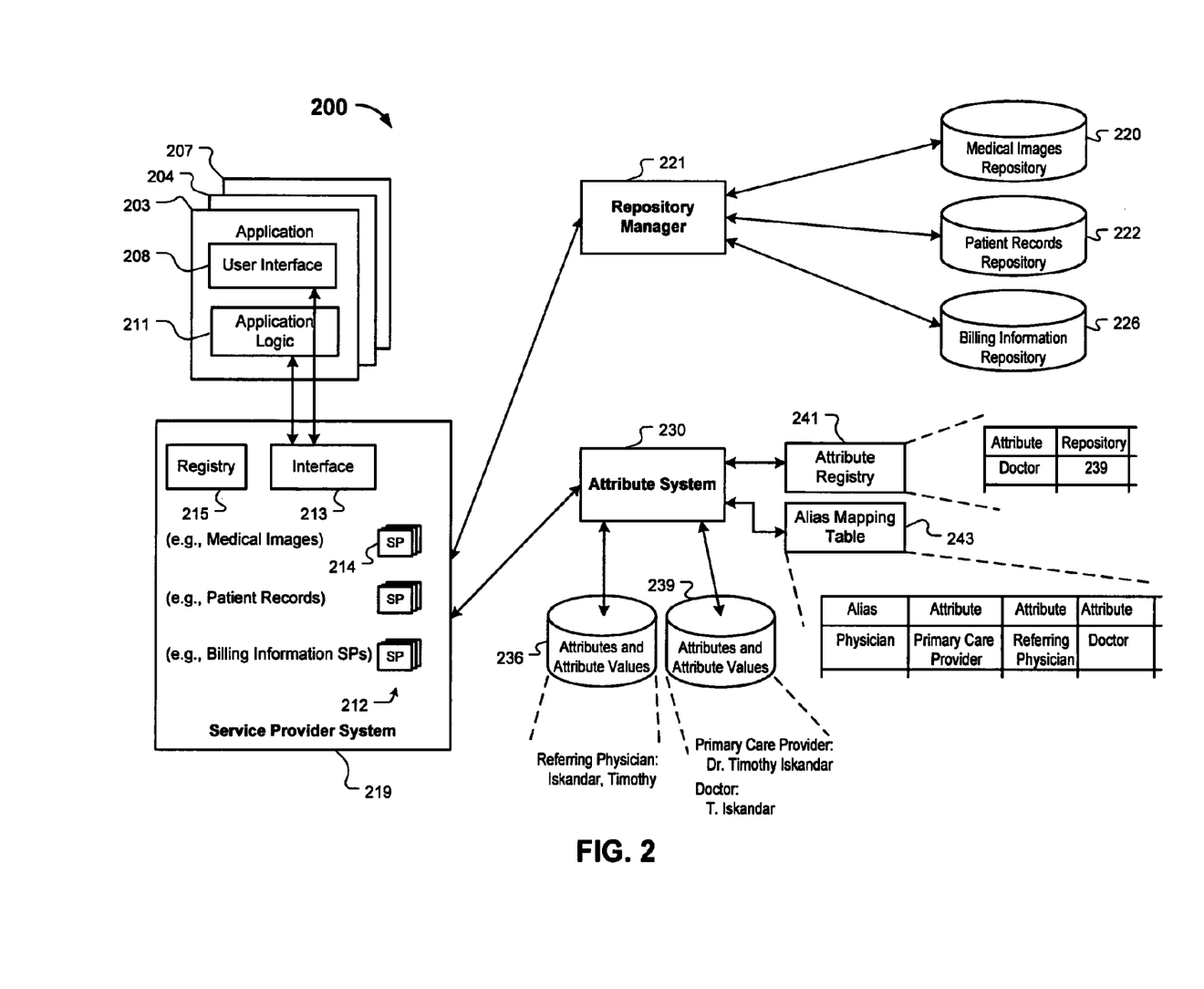
FIG. 2 is a conceptual illustration of an exemplary information management system that may be used to manage information in an exemplary environment, such as that shown in FIG. 1, according to some embodiments.

FIG. 2 is a conceptual illustration of an exemplary information management system 200 that may be used to manage information in the exemplary environment 100. The information management system 200 may include various applications 203, 204 and 207, each of which may perform a different task within the system 200. By way of example, one application may process medical images, such as MRIs. Another application may process patient medical records. Another application may process billing or other accounting documents. In some embodiments, each application may include a user interface 208 and application logic 211.

The user interface 208 may provide output to a user and receive input from the user. For example, the user interface 208 may cause graphical information to be presented on the display of a computer terminal, such as, for example, the computer terminal 154 that is shown in FIG. 1. Output may be presented in other ways, as well. For example, the user interface 208 may control a printer device or cause a file to be stored in a storage device, such as, for example, the networked database 171.

The application logic 211 may control internal access to and transformation of information within the information management system 200. For example, the application logic 211 may include programming code that is executed in part by the server 175. The application logic, through execution of the programming code, may cause information to be retrieved from a database, such as a patient medical record from the medical information server 130 and corresponding database 170. Through the user interface 208, the retrieved information may be displayed on a computer terminal, such as the computer terminal 154. For example, using the application 203 and its corresponding user interface 208 and application logic 211, a reviewing physician may view the patient medical records and make changes or additions to it. The user interface 208 may receive the changes or additions, and the application logic may save these changes or additions to the patient medical record in the medical information server 130.

To perform various tasks, both the user interface 208 and the application logic 211 may use service provider (SPs), such as the service providers 212. A service provider may include a module of programming code that performs a particular function or provides a particular interface. For example, in some embodiments, the service provider may be implemented in an object-oriented computer programming language, and the service provider may include one or more object-oriented classes that may be used to process a particular kind of data object. More particularly, one service provider, or set of service providers, may employ programming code that implements a first set of object-oriented classes to process MRI image data; another service provider, or set of service providers, may employ programming code that implements a second set of object-oriented classes to process billing documents or other accounting information. Service providers may allow an application to divide various tasks into smaller subtasks that may be performed by reusable, parameterized portions of code.

The service providers 212 may be registered in and accessed through a service provider system 219. The service provider system 219 may provide an interface 213 between the service providers 212 and the user interface 208 or the application logic 211. Such an interface 213 may facilitate an efficient design, coding, configuration, and runtime process by providing an important layer of abstraction. More particularly, the interface 213 may receive input that identifies a particular task to perform, such as, for example, to "retrieve the MRI record having identifier 718974 for display." In some embodiments, the task may inherently identify, at a programming code level, one or more object-oriented classes that are able to execute the task. Based on the object-oriented classes that are able to execute the task, the interface 213 may identify one or more service providers (e.g., service provider 214) that implements the identified object-oriented classes, and the interface 213 may further pass to the identified service provider 214 any parameters necessary to execute the task (e.g., "MRI record 718974"). After the identified service provider 214 executes the task, the interface 213 may return any data or output to the user interface 208 or to the application logic 211. For example, in the scenario described above involving retrieving an MRI record, the service provider 214 may perform "back-end" tasks, such as, for example, navigating any networks between the computer executing the application 203 and the medical images repository 220, where the MRI record may be stored; authenticating the access of the medical images repository 220; and actually retrieving and copying data associated with the relevant MRI record. The interface 213 may provide this retrieved data to the application 203.

In this manner, application developers may be able to develop applications 203, 204 or 207 to interact with the service provider system 219 and with that system's interface 213, rather than with individual service providers. Similarly, service provider developers may develop service providers 212 to interact with relevant back-end components and with the interface 213, rather than with individual applications 203, 204 or 207. That is, the service provider system 219 may provide a standard interface that facilitates efficient development of service providers and applications.

In some embodiments, each service provider may be designed in a "design stage," and coded in a "coding stage" by a different software provider. One software provider, for example, may design and code a service provider to provide an interface to a particular database or repository. Another software provider may design and code another service provider to provide certain input/output functionality in a digital information system. In a "configuration stage," the various service providers may be integrated into a single system. Integration within the system may involve registering the service providers with the service provider system 219. For example, in some embodiments, service providers may be registered in a registry 215. More particularly, in some embodiments, a list or description of the object-oriented classes each service provider implements may be registered in the registry 215. The interface 213 may then use the registry 215 to identify one or more service providers that implement a desired set of object-oriented classes.

As described above, in some embodiments, the service provider framework may cause an appropriate service provider to be called or executed at runtime in order to provide desired functionality. In these embodiments, service providers may be added or replaced through registration or removal from the service provider framework. Thus, the service provider framework may provide a runtime interface between service providers and other parts of the system.

The information management system 200 may also employ a repository manager 221. In some embodiments, the repository manager 221 may provide a standardized interface to various repositories, such as the repositories 220, 222 and 226, and various service providers may access the various repositories through the repository manager 221. Some embodiments may omit the repository manager 221, and the service providers may interface directly with the various repositories.

The information management system 200 may also employ an attribute system 230 to manage various attributes associated with data objects in the information management system 200. The attributes and corresponding attribute values may be stored in two or more attribute repositories 236 or 239, and the attribute system 230 may provide a standardized interface to the attribute repositories 236 and 239. Through the interface provided by the attribute system 230, the service providers may access attributes and attribute values corresponding, for example, to data objects that are stored in the various data object repositories 220, 222 and 226. By way of example, while one of the service providers 214 is accessing the medical images repository 220 in the scenario described above, another one of the service providers 214 may access the attribute system 230 to retrieve attributes associated with, for example, "MRI record 718974." Such attributes may provide information about the MRI record (e.g., corresponding patient demographic information, referring physician, etc.), or the attributes may provide display parameters that affect display of the MRI image data in for example, the user interface 208 (e.g., "display MRI images in a scrollable section of record, three images per row").

To identify the attribute repository (e.g., 236 or 239) that stores a particular attribute, the attribute system may employ an attribute registry 241. In some embodiments, the attribute registry 241 may include an attribute index or hash table, for example, that maps attributes to particular attribute repositories. For example, upon receipt of an identifier associated with an attribute to retrieve (e.g., "Doctor"), the attribute system may access the attribute registry 241 to determine a corresponding attribute repository (e.g., 239), and may retrieve the corresponding attribute value from the determined repository (e.g., "T. Iskandar").

In some embodiments, the attribute system may also include an alias mapping table 243. The alias mapping table 243 may associate attributes in different repositories with each other and with an alias name. For example, the attribute repository 236 may store an attribute with an attribute name "Referring Physician" that may correspond to an MRI image data object in the MRI image repository 220; the attribute repository 239 may store an attribute with an attribute name "Doctor" that may correspond to a billing data object in the billing information repository 226; and the alias mapping table 243 may store an alias name "Physician" that is associated with the "Referring Physician" attribute and the "Doctor" attribute. In some embodiments, a search routine may access the alias mapping table 243 to identify various related attributes and may subsequently search the identified attributes for attributes having attribute values the correspond to a search parameter.

By way of example, a user of the information system may wish to identify all data objects in the system associated with a particular physician (e.g., "Dr. Timothy Iskandar"). The user may enter the physician's name (a "search value") into a search routine and specify an alias attribute name to use in the search (e.g., "Physician"). The search routine may, for example, access the alias mapping table 243 to identify that at least two attributes are associated with the alias name "Physician" (e.g., "Referring Physician" and "Doctor"). The search routine may then access the attribute registry 241 to determine the attribute repository that stores each of the associated attributes; and the search routing may then search each respective repository for one of the associated attributes with a value that corresponds to the search value. More particularly, the search routine may search one attribute repository for a "Referring Physician" attribute having an attribute value that corresponds to "Dr. Timothy Iskandar," and a second repository for a "Doctor" attribute having an attribute value that corresponds to "Dr. Timothy Iskandar."

As another example, a user of the information system may wish to identify all data objects that match several parameters, such as, for example, data objects that are associated with both a particular physician (e.g., "Dr. Timothy Iskandar") and a particular patient (e.g., Amanda Lizette"). The user may enter a search string that includes a plurality of alias names and a plurality of corresponding search values (e.g., "Physician matches Iskandar and Patient matches Lizette"). In some embodiments, the search routine may identify, for example, metadata elements that match either "Physician" (e.g., "Primary Care Provider," Referring Physician," or "Doctor") or "Patient" (e.g., Patient," Patient Name," or "Responsible Party"). Subsequently, the search routine may identify attributes that correspond to the identified metadata elements that have values that match either "Iskandar" or "Lizette," respectively. Then, the search routine may identify data objects the have all identified attributes with matching attribute values from the search string (e.g., data objects having a "Primary Care Provider," "Referring Physician," or "Doctor" attribute matching "Iskandar," and a "Patient" or "Patient Name," or "Responsible Party" attribute matching "Lizette").

In some embodiments, the attribute system may associate attributes with alias names in other ways. For example, each attribute may have various metadata. Some metadata may affect how attributes are processed. For example, metadata may include parameters that affect how and when an attribute is to be displayed, whether an attribute is searchable, a data type of the attribute (e.g., integer, string, etc.), and whether a corresponding attribute value may be changed. Some metadata may also identify an alias name to associate with the corresponding attribute name. For example, referring to the example above, a first attribute with an attribute name "Referring Physician" may have a metadata element that associates the alias name "Physician" with the first attribute; similarly, a second attribute with an attribute name "Doctor" may have a metadata element that also associates the alias name "Physician" with a second attribute. In some embodiments, a search routine may search metadata for an alias name that matches a target alias name, then subsequently search corresponding attributes for attribute values that match a search value. In some embodiments, metadata may be stored in an attribute system, such as, the attribute system 230. More particularly, in some embodiments, metadata may be stored in metadata repositories (not shown); in some embodiments, metadata may be stored in attribute repositories, (e.g., repositories 236 or 239) with attribute names or attribute values.

In some embodiments, an attribute value may correspond to or match a search value if it at least partially matches the search value. For example, in the scenario described above, the search routine may determine that an attribute value corresponds to the search value if it includes "Iskandar." In some embodiments, a search routine may use fuzzy logic to identify even variations of search values, for example, to identify correspondences with misspelled search values. Moreover, in some embodiments, the search routine may enable searches with "wildcards" or truncated search terms. For example, the search routine may enable a search value of "%Iskand%," where the '%' character represents a wildcard.

As will be described in further detail with reference to the remaining figures, the search routine may identify data objects associated with the attributes after identifying attributes whose attribute values correspond to the search value. As a preliminary example, the search routine may identify an MRI record in the medical images repository 220 that has a "Referring Physician" attribute corresponding to a search value of "Dr. Timothy Iskandar," and that routine may further identify a billing document that has a "Doctor" attribute corresponding to a search value of "Dr. Timothy Iskandar." As described above, the correspondence between the search value and the attribute value may not be exact; the "Referring Physician" attribute may be, for example, "Iskandar, Timothy," and the "Doctor" attribute value may be "T. Iskandar."

In the manner described above, the information system 200 may enable a user of the system to quickly and efficiently identify data objects in two or more repositories that meet some criterion.

A single repository, such as the repository 220 or the repository 226, may be physically implemented in more than one databases or storage devices. For example, referring back to the exemplary system 100 that is shown in FIG. 1, the repository 220 may be implemented by the databases 142, 143 and 170.

Figure 3A:
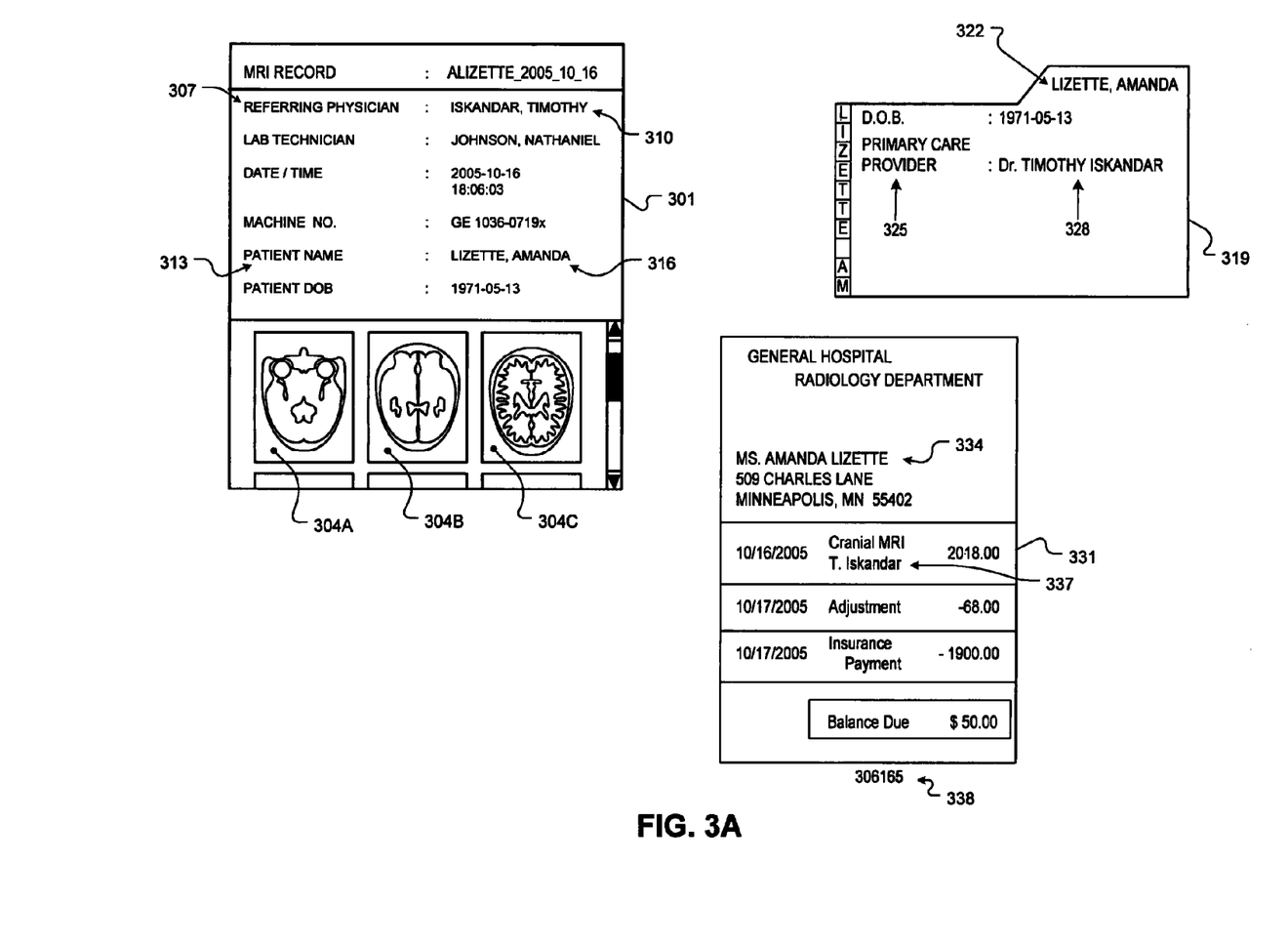
FIG. 3A is a diagram showing various kinds of information that may be stored in an exemplary information management system, according to some embodiments.

FIG. 3A is a diagram showing various kinds of information that may be stored in the exemplary information management system 200. Information may be stored, for example, in documents, records, database tables, or other data structures. In the context of the exemplary environment 100, the information system 200 may store, for example, an MRI record 301 that includes various MRI images 304A, 304B and 304C. The MRI record 301 may include other information, such as information about a patient, a physician who ordered the MRI ("referring physician"), etc. Logically and physically this information may be stored in various places.

Figure 3B:
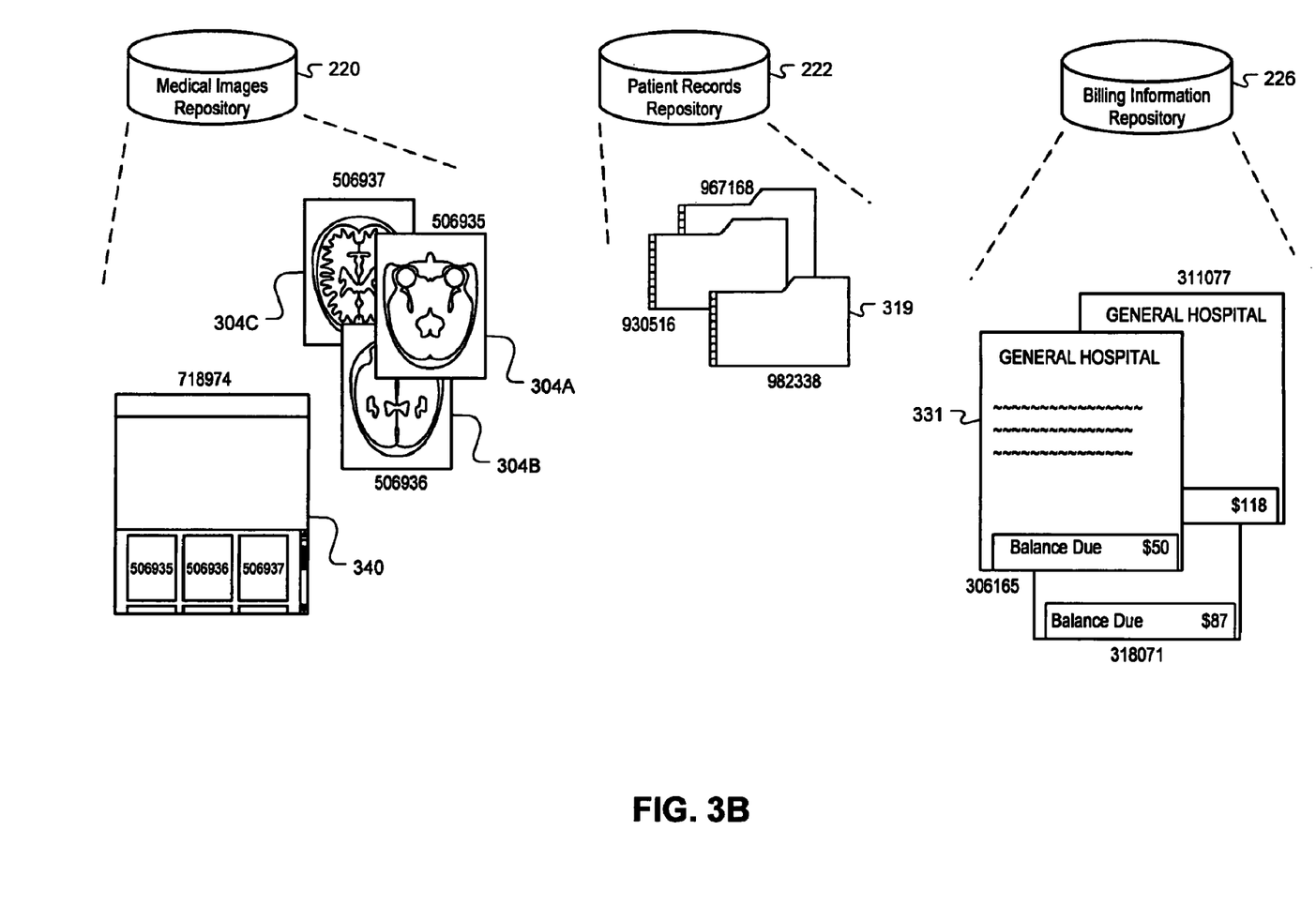
FIG. 3B is a diagram of various repositories that may store data objects, such as those described with reference to FIG. 3A, according to some embodiments.

Logically, each MRI image 304A, 304 B, and 304C may be stored in the medical images repository 220 (see FIG. 2 and FIG. 3B). In some embodiments, the medical images repository 220 may be included in the information management system 200. In some embodiments, each element stored within the repository may have an identifier, such as a global unique identifier (GUID), which may facilitate the elements' processing within the database system.

Physically, in some embodiments, the medical images repository 220 may be implemented in a single database, such as, for example, the database 142 (see FIG. 1). In some embodiments, the medical images repository 220 may be physically implemented in several, remotely distributed databases, such as, for example, the databases 142, 143, 170 and 171.

Some of the information shown in the MRI record 301 may be stored as attributes and attribute values within an attribute system. For example, information about a physician who ordered the MRI images may be stored as attribute 307 having an attribute name "Referring Physician." As shown in the MRI record 301, the attribute 307 has a corresponding attribute value 310 of "Iskandar, Timothy." Similarly, a shown, the MRI record 301 may store patient information in an attribute 313 having an attribute name of "Patient Name" and an attribute value 316 of "Lizette, Amanda."

As shown in FIG. 3A, certain attribute names, such as the attribute names of the attributes 307 and 313, may be displayed with data objects, such as the MRI images 304A, 304B and 304C. For example, attribute names and attribute values may be displayed when the MRI record 301 is displayed on a computer device, such as the computer device 154. In other cases, as will be described below, data objects may be displayed without corresponding attribute names. For example, attributes may affect processing of data objects but be "hidden" from a user. Attribute values, likewise, may not always be displayed with data objects with which they are associated. In some embodiments, attributes may be parameters that describe or provide context for other information; in these other embodiments, attributes may be displayed (e.g., attribute names and values may be displayed).

The information system 200 may also store medical records associated with various patients, such as the medical record 319. As shown, the medical record 318 corresponds to the patient whose MRI images are captured in the MRI record 301. In some embodiments, the medical record 319 may include or reference the MRI record 301. In some embodiments, the medical record 319 may include other information, such as doctors' notes, lab reports, medical history, etc. This information may be stored in various electronic formats, such as, for example, text documents or text formats, a scanned image format corresponding to paper records, or other formats associated with electronic medical diagnosis or imaging equipment. As shown, the medical record 319 may schematically depict a data structure that includes or references the various information described above. For example, the medical record 319 may be a logical "container" for data.

When the medical record 319 is displayed, for example, on a computer such as the computer device 154, the medical record 319 may be displayed substantially as shown in FIG. 3A (e.g., the medical record 319 may be graphically displayed as a paper-based record folder). As shown, some attribute names and values may be displayed while others are not. For example, the attribute name 325 "Primary Care Provider" is displayed along with a corresponding attribute value 328 "Dr. Timothy Iskandar." However, another attribute value 322 (e.g., "Lizette, Amanda") may be displayed without an attribute name (e.g., "Patient").

Logically, the medical record may be stored in a patient records repository 222 (see FIG. 2 and FIG. 3B). In some embodiments, the patient records repository 222 may be logically separate from other repositories, such as the medical images repository 220. In some embodiments, the patient records repository 222 may be physically implemented in a single data base, such as, for example, the database 170 (see FIG. 1). In some embodiments, the patient records repository 222 may be implemented in several remotely distributed databases, such as, for example, the databases 143, 170 and 171.

Some information in the patient medical record 319 may also be stored as attributes and attribute values within an attribute system. For example, information about the patient may be stored in one or more attributes of the patient medical record. More particularly, as shown in FIG. 3A, one attribute may have an attribute value 322 for the patient's name. Another attribute 325 may have an attribute value 328 for the primary physician with whom the patient consults.

The information system may also store billing information associated with various medical services. For example, the information system 200 may store a billing document 331 associated with services rendered to capture the MRI images 304A, 304B and 304C. In some embodiments, billing information, such as the billing document 331, may be stored in a billing information repository 226 (see FIG. 2 and FIG. 3B). The billing document 331 and other information may be referenced within the billing information repository 226 by a GUID 338. For simplicity, GUIDs, such as the exemplary GUID 338 ("306165"), are graphically depicted in the figures as having six digits or "bits." In some embodiments, the GUID may include many more digits or bits; for example, many GUIDs may actually comprise 128 bits.

Some information in the billing document 331 may also be stored as attributes and attribute values. For example, the billing information 331 may have an attribute with an attribute name of "Responsible Party" (attribute name not shown in FIG. 3A), and an attribute value 334 of "Ms. Amanda Lizette." As another example, the billing document may have another attribute with an attribute name "Doctor" (attribute name not shown in FIG. 3A), and an attribute value 337 of "T. Iskandar."

FIG. 3B is a diagram of various repositories that may store data objects such as those described with reference to FIG. 3A. As shown, each logical repository may store a particular kind of data object. For example, the billing information repository 226 may store billing documents, such as the billing document 331 that was illustrated in more detail in FIG. 3A. In some embodiments, each data object in the billing information repository 226 may have a GUID with which it is accessed (e.g., "306165," "311077," and "318071"). Similarly, the patient records repository 222 may store various patient medical records, such as the medical record 319. Each medical record may also have its own GUID (e.g., "930516," "967168," and "982338"). Moreover, various medical records may have subcomponents that themselves have GUIDs (not shown). Similarly, the medical images repository 220 may store medical images, such as the medical images 304A, 304B and 304C. Further, the medical images repository 220 may store a "container" 340 that may provide an overlying structure for individual medical images. The images may each have their own GUIDs, as shown, and in some embodiments, the container 340 may reference its underlying images by GUIDs. In some embodiments, the container 340 may be, for example, a data object type; and in some embodiments, rather than referencing specific data objects (e.g., the images with GUIDs "506935," "506936," and "506937"), the data object type may reference other data object types (e.g., an "MRI Image Type").

In some embodiments, attributes and attribute values for various data objects may be stored in repositories other than data object repositories, such as the data object repositories 220, 222, 226. For example, as will now be described with reference to FIG. 3C, attributes and attribute values may be stored in attribute repositories, such as the attribute repositories 236 and 239.

Figure 3C:
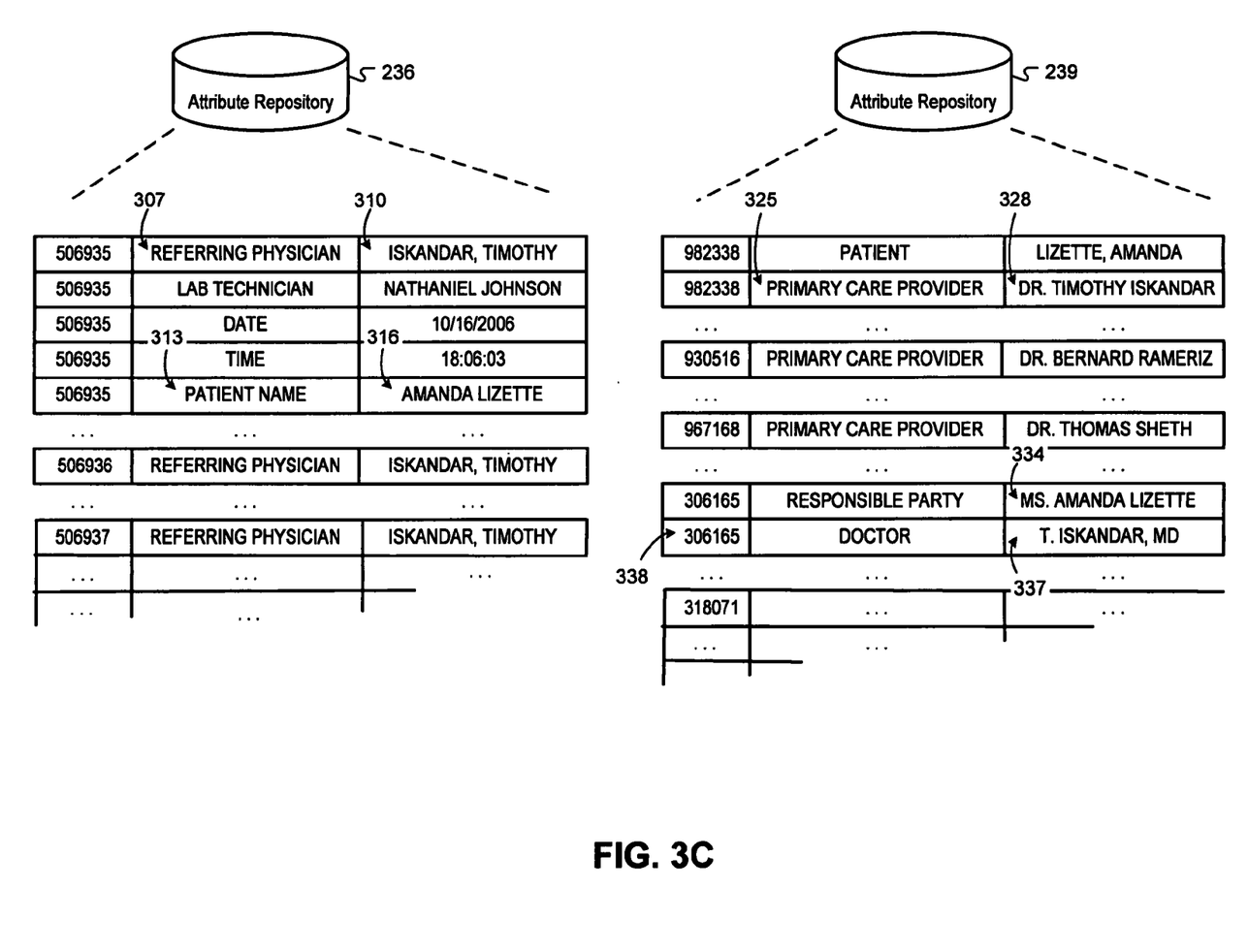
FIG. 3C is a diagram illustrating exemplary attribute repositories and the attributes that may be stored in attribute repositories, according to some embodiments.

FIG. 3C is a diagram illustrating exemplary attribute repositories and the attributes that may be stored in the attribute repositories. As shown, the attribute names and attribute values correspond to attribute names and attribute values that are shown in context in FIG. 3A and FIG. 3B. As described, each attribute may be characterized by an attribute name and an attribute value. Further, each attribute may be associated with database objects by a GUID, such as, for example, the GUID 338. In some embodiments, data object GUIDs, attribute names and attribute values may be stored in table format in the respective repositories. For example, the attribute repository 239 may be included in a relational database management system (RDBMS), and GUIDs, attribute names and attribute values may be stored in one or more relational database tables in the RDBMS.

Figure 4A:
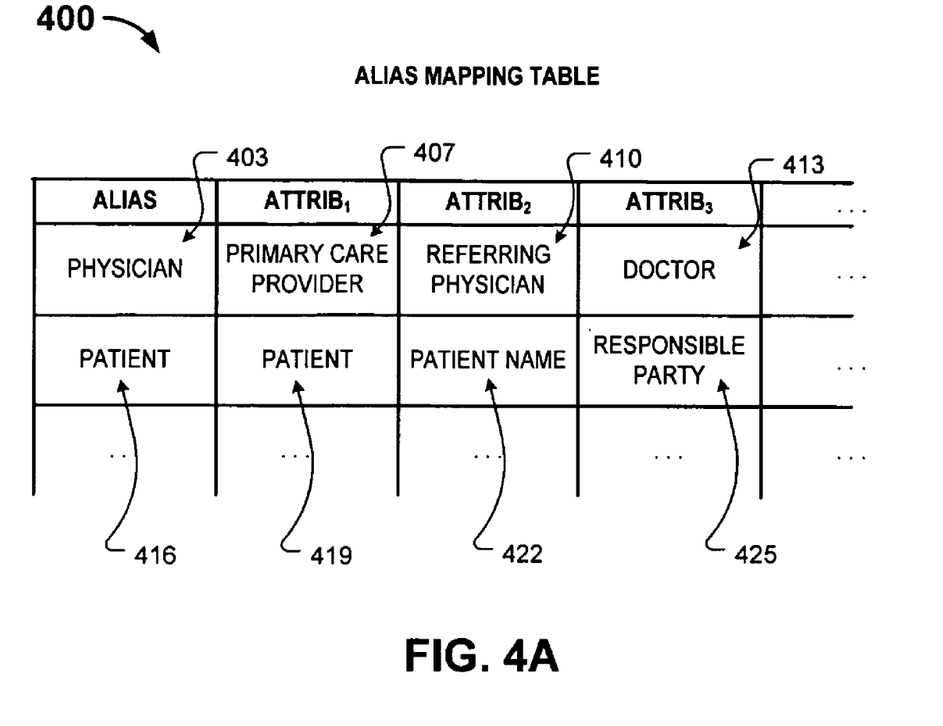
FIG. 4A is a diagram of an exemplary alias mapping table, according to some embodiments.

FIG. 4A is a diagram of an exemplary alias mapping table 400. In some embodiments, the alias mapping table may also comprise rows in one or more relational database tables. However it is physically implemented, an alias mapping table may associate an alias name, such as the alias name 403 "Physician" with two or more attribute names, such as, for example, the attribute names "Primary Care Provider" 407, "Referring Physician" 410 and "Doctor" 413. As shown, an alias name may be the same name as an attribute name with which it is associated, or the alias name may be different than that attribute names with which it is associated. As will be described in more detail with reference to FIG. 6, a search application may access the alias mapping table 400 in order to, for example, search for data objects that have attributes with particular attribute values (e.g., search values).

Figure 4B:
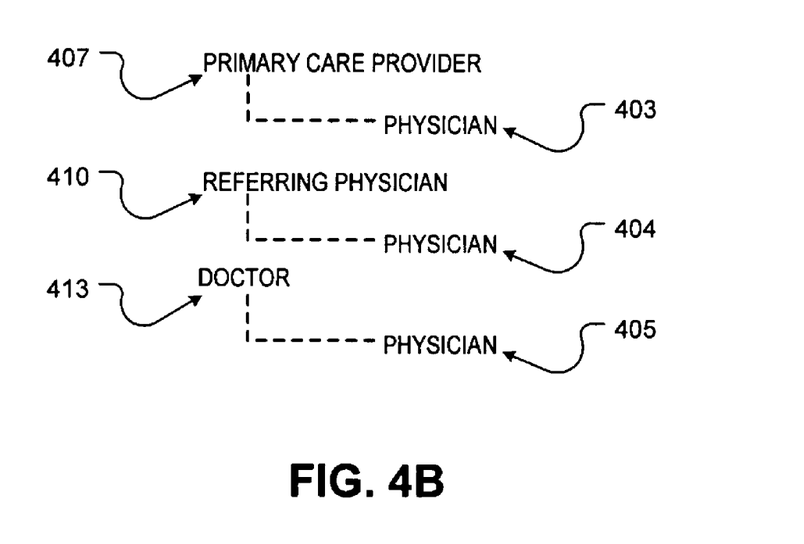
FIG. 4B is a diagram of exemplary metadata associating an alias name with an attribute, according to some embodiments.

FIG. 4B is a diagram of exemplary metadata associating an alias name with an at. As shown, an attribute 407 with attribute name "Primary Care Provider" may have metadata 403 that specifies an alias name (e.g., "Physician"); another attribute 410 with attribute name "Referring Physician" may also have metadata 405 that specifies the same alias name (e.g., "Physician"); and so on. Thus, by search for metadata that identifies an alias name having a target alias name, an information management system may identify two or more related attributes. In some embodiments, the information management system may subsequently identify data objects corresponding to the two or more related attributes.

Figure 5:
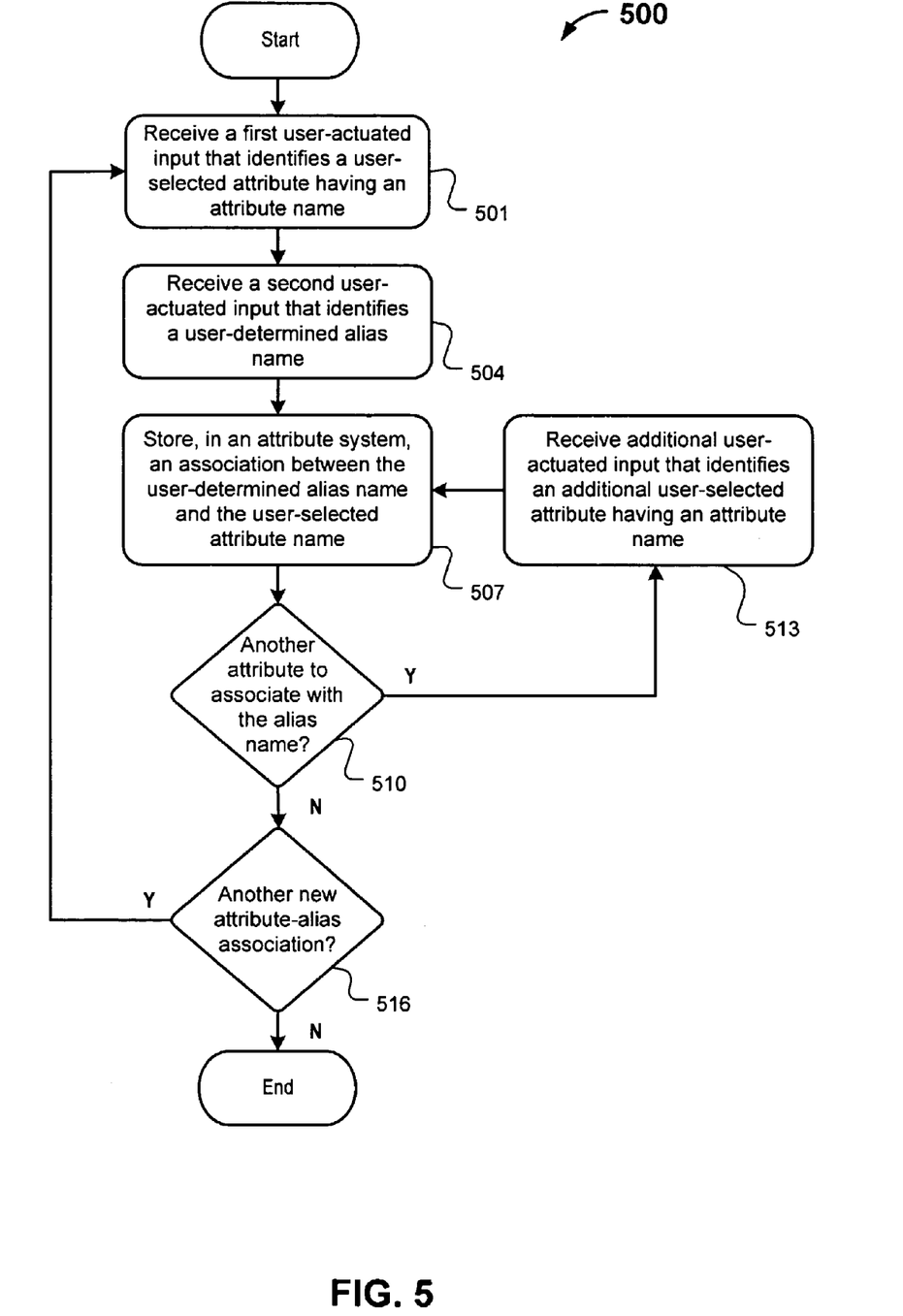
FIG. 5 is a flow diagram of an exemplary method for configuring a database system for a global attribute search, according to some embodiments.

FIG. 5 is a flow diagram of an exemplary method 500 for configuring a database system for a global attribute search. In an exemplary embodiment, the method 500 may be performed by an administrative computer device, such as, for example, the administrative terminal 151 that is shown in FIG. 1.

In some embodiments, the method 500 may include receiving (501) a first user-actuated input that identifies a user-selected attribute having an attribute name. For example, the administrative terminal 151 may receive user-actuated input (e.g., input from a keyboard and mouse) that identifies a user-selected attribute having an attribute name (e.g., "Primary Care Provider"). In some embodiments, the identified attribute may be selected from a list of attributes that are already registered in a corresponding database system. For example, the administrative terminal 151 may display a list of attributes that are, for example, registered in the attribute system 230. In some embodiments, a user may create a new attribute in the attribute system 230 and subsequently select is as part of the method 500.

The method 500 may receive (504) a second user-actuated input that identifies a user-determined alias name. For example, the administrative terminal 151 may receive user-actuated input that identifies a user-determined alias name (e.g., "Physician"). In some embodiments, the user-determined alias name may be selected from a list of alias names. For example, the administrative terminal 151 may display a list of alias names that are registered in the attribute system 230, and a user may select an alias name from the list. In some embodiments, an information management system may be configured with a default list of alias names. In some embodiments, each alias name is received from a user-actuated input during performance of the method 500.

The method 500 may store (507), in an attribute system, an association between the user-determined alias name and the user-selected attribute name. For example, the administrative terminal 151 may cause a new row to be written in a database table associating the user-selected attribute name (e.g., "Primary Care Provider") with the user-determined alias name (e.g., "Physician"). In some embodiments, this database table may be an alias mapping table 243 in an attribute system 230. In some embodiments, the association may be stored (507) as metadata element associated with the attribute; more particularly, each attribute (e.g., "Primary Care Provider," "Referring Physician," or "Doctor") may have a metadata element that identifies a common alias name (e.g., "Physician)

The method may determine (510) whether another attribute is to be associated with the alias name. For example, in some embodiments, the administrative terminal may query a user for additional attributes to associate with the alias name (e.g., with a prompt or menu in a graphical user interface).

If the method 500 determines (510) that an additional attribute name is to be associated with the alias name, the method 500 may include receiving (513) additional user-actuated input that identifies an additional user-selected attribute having an attribute name (e.g., "Referring Physician"). An association between this attribute and the alias name may also be stored (507) in the attribute system. For example, the administrative terminal 151 may cause another column to be written in a database table row that currently includes the alias name and one or more other attribute names. The actions of storing (507), determining (510) and receiving (513) additional input may be repeated several times. For example, additional user-actuated input may be received that identifies another attribute name (e.g., "Doctor") to associate with the alias name (e.g., "Physician").

If the method 500 determines (510) that no additional attribute name is to be associated with the alias name, the method may include determining (516) whether other attribute-alias associations are to be received. For example, the administrative terminal 151 may query the user for additional associations. Subsequently, the administrative terminal 151 may receive (501) user-actuated input that identifies another user-selected attribute (e.g., "Responsible Party"). The method 500 may further receive (504) user-actuated input that identifies another user-determined alias name (e.g., "Patient"), and the method 500 may store (507) an association between the user-selected attribute name and user-determined alias name.

Figure 6:
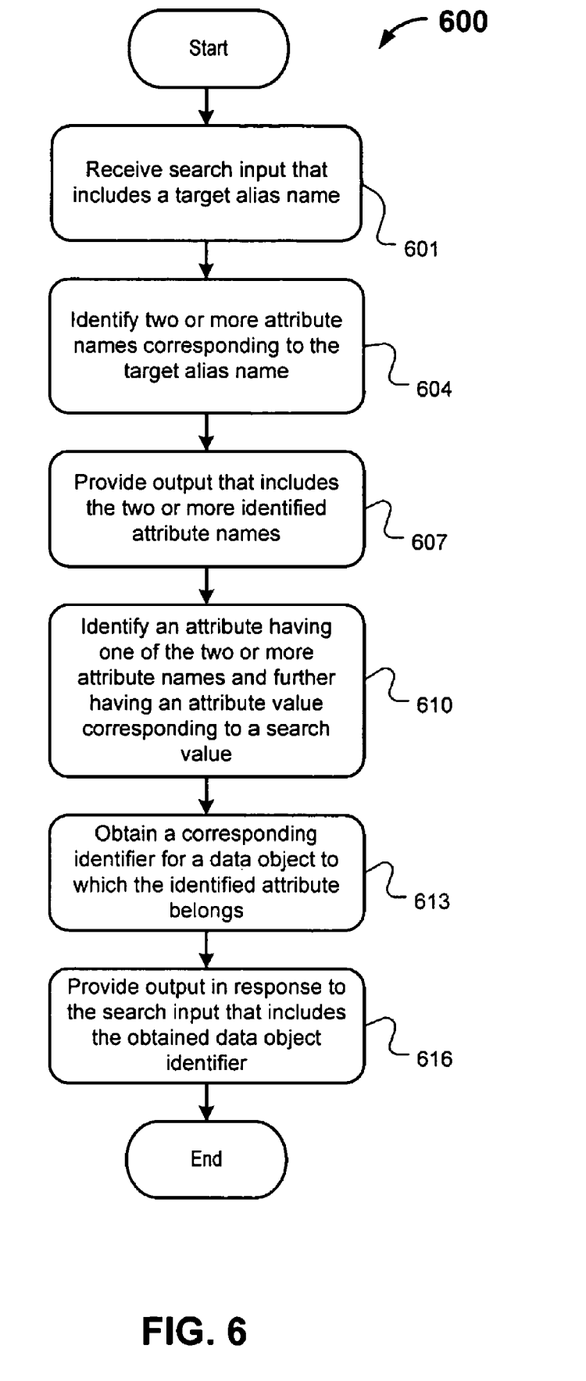
FIG. 6 is a flow diagram of an exemplary method for performing a global attribute search, according to some embodiments.

FIG. 6 is a flow diagram of an exemplary method 600 for performing a global attribute search. In an exemplary embodiment, the method 600 may be performed by a computer device, such as, for example, the user terminal 113 that is shown in FIG. 1. More particularly, the method 600 may be performed by a search application program running on the user terminal 113, or on another computer device connected (e.g., via a network) to the user terminal 113.

In some embodiments, the method 600 may include receiving (601) search input that includes a target alias name. For example, the user terminal 113 may receive user-actuated input that includes the target alias name "Physician." In some embodiments, the search input may be received in response to a menu display, such as, for example, a menu displaying a listing of various possible alias names. In some embodiments, the search input may be entered by a user directly. In some embodiments, the search input may be received by an application program, without any direct interaction with a user.

The method 600 may include identifying (604), in a mapping table, two or more attribute names corresponding to the target alias name. For example, the user terminal 113 may access the alias mapping table 243 in the attribute system 230. More particularly, the user terminal 113 may transmit to the attribute system 230, the alias name (e.g., "Physician"); in response, the attribute system 230, using the alias mapping table 243, may retrieve two or more attribute names that are associated with the alias name (e.g., "Primary Care Provider," "Referring Physician," and "Doctor"). As another example, the user terminal 113 may cause a metadata search to be executed that identifies metadata elements that specify a matching alias name (e.g., "Physician"). Matching metadata elements may identify attribute names of attributes that are associated with the alias name (e.g., "Primary Care Provider," Referring Physician," and "Doctor").

The method 600 may include providing (607) output that includes the two or more identified attribute names. For example, the user terminal 113 may display the attribute names retrieved by the attribute system 230 using the alias mapping table 243 (e.g., "Primary Care Provider," "Referring Physician," and "Doctor") or using a metadata search, and that are associated with the alias name (e.g., Physician). In some embodiments, the attribute system 230 may provide the attributes to a search application without causing them to be displayed.

The method 600 may include identifying (610) an attribute having one of the two or more attribute names and further having an attribute value corresponding to a search value. For example, in some embodiments, the received (601) search input may also include a search value (e.g., "Iskandar"), and the attribute system 230 may query various attribute repositories 236 and 239 for attributes having the identified (604) attribute names. More particularly the attribute system 230 may query the attribute repository 239 for attributes having the attribute name "Primary Care Provider." Referring to FIG. 3C, this query may identify, for example, three rows in a database table (e.g., the rows that include "982338," "930516," and "967168). After identifying these rows that have matching attribute names, the attribute system may further query the rows for one or more rows that have attribute values that match the search value (e.g., "Iskandar").

The method 600 may include obtaining (613) a corresponding identifier for a data object to which the identified attribute belongs. For example, the attribute system may identify the row in the database table that includes "982338," which, in some embodiments, may be a GUID corresponding to a data object. More particularly, this identified row in the database table may comprise an attribute for the patient medical record 319 that is stored in the patient records repository 222. As described above, a "match" or correspondence between the search value and an attribute value may be a partial match; for example, in some embodiments, the attribute system may apply a search application that uses fuzzy logic to identify matches.

The method 600 may include providing (616) output in response to the search input that includes the obtained data object identifier. For example, in some embodiments, the user terminal 113 may display at least a portion of the data object corresponding to the obtained (613) data object identifier. More particularly, the user terminal 113 may display the medical record 319 having the GUID "982338" that corresponds to the attribute having the attribute name "Primary Care Provider" and further having an attribute value that matches the search value "Iskandar."

In some embodiments, various actions in the method 600 may be performed simultaneously or in sequence for different attribute names. For example, while the attribute system is querying attribute repository 239 for attributes having the attribute name "Primary Care Provider," the attribute system 230 may also be querying the attribute repository 236 for attributes having attribute names "Referring Physician" and attribute values that match the search value. Moreover, the attribute system 230 may also query the attribute repository 239 for attributes having the name "Doctor" and having attribute values that match the search value.

In the manner described, the method 600 may be used to identify various data objects having attributes with attribute values that match a search value, even if the corresponding attribute names are different than each other or different than an alias name. Moreover, in some embodiments, the method 600 may be performed efficiently and quickly, without need for a fill-text search of an attribute database.

In some embodiments, the attribute system may identify an attribute repository to query for a particular attribute name through use of an attribute registry. For example, the attribute system 230 may use the attribute registry 241 to initially focus a search of various attribute repositories, such as the attribute repositories 236 and 239.

Figure 7:
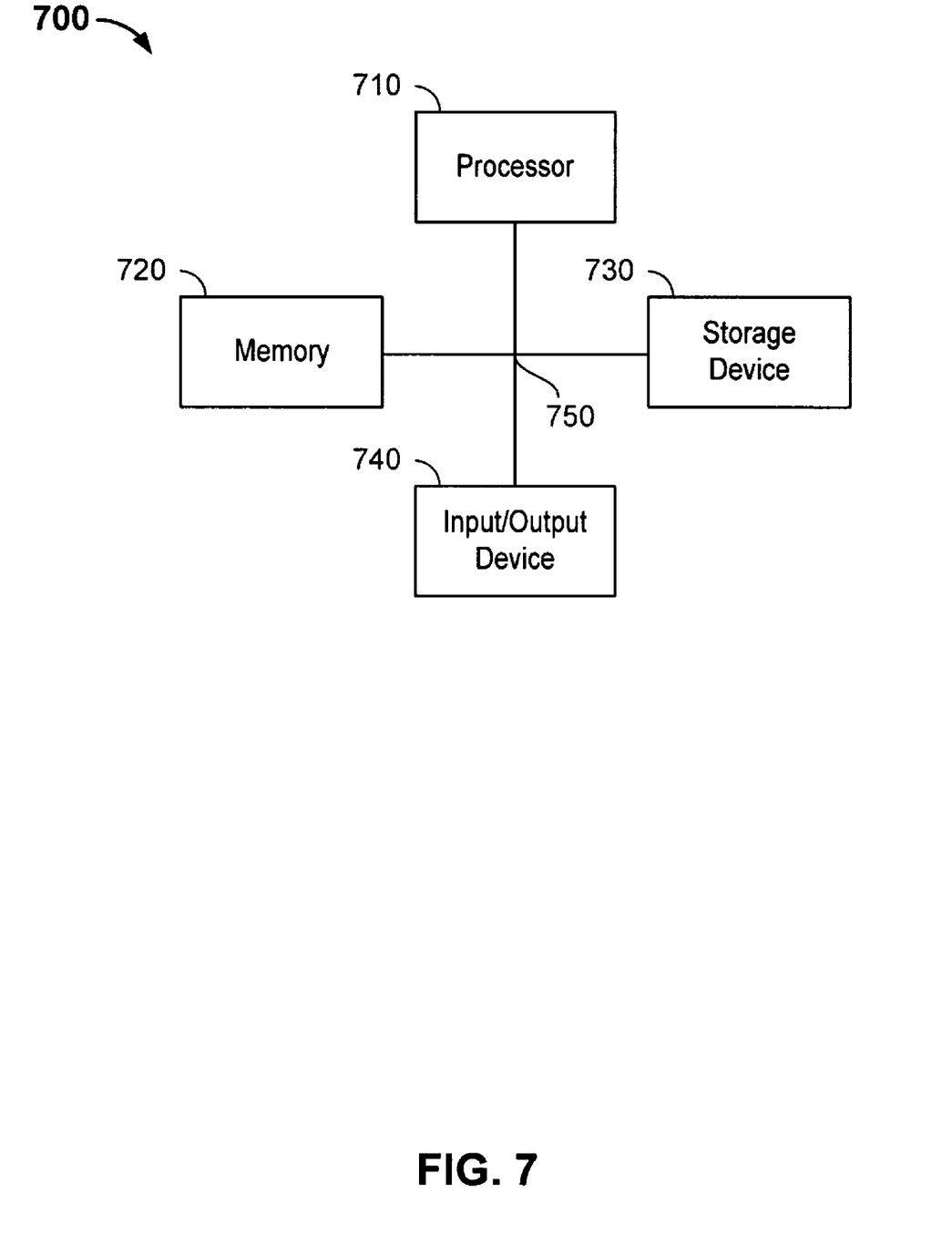
FIG. 7 is a block diagram of a computer device that may be used in the operations described above, according to some embodiments.

FIG. 7 is a block diagram of a computer device 700 that may be used in the operations described above, according to some embodiments. The computer device 700 includes a processor 710, a memory 720, a storage device 730 and an input/output device 740. Each of the components 710, 720, 730 and 740 are interconnected using a system bus 750.

The processor 710 is capable of processing instructions for execution within the computer device 700. In some embodiments, the processor 710 is a single-threaded processor. In other embodiments, the processor 710 is a multi-threaded processor. The processor 710 is capable of processing instructions stored in the memory 720 or on the storage device 730 to display graphical information for a user interface on the input/output device 740.

The memory 720 stores information within the computer device 700. In some embodiments, the memory 720 is a computer-readable medium. In some embodiments, the memory 720 is a volatile memory unit. In some embodiments, the memory 720 is a non-volatile memory unit.

The storage device 730 is capable of providing mass storage for the computer device 700. In some embodiments, the storage device 730 is a computer-readable medium. In various other embodiments, the storage device 730 may be a floppy disk device, a hard disk device, an optical disk device, or a tape device.

The input/output device 740 provides input/output operations for the computer device 500. In some embodiments, the input/output device 740 includes a keyboard and/or pointing device. In some embodiments, the input/output device 740 includes a display unit for displaying graphical user interfaces.

The method may be implemented in digital electronic circuitry, or in computer hardware, firmware, software, or in combinations of them. Apparatus may be implemented in a computer program product tangibly embodied in an information carrier, e.g., in a machine-readable storage device or in a propagated signal, for execution by a programmable processor; and actions of the method may be performed by a programmable processor executing a program of instructions to perform functions of the invention by operating on input data and generating output. Embodiments may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (application-specific integrated circuits).

To provide for interaction with a user, a computer device may include a display device such as a CRT (cathode ray tube) or LCD (liquid crystal display) monitor for displaying information to the user and a keyboard and a pointing device such as a mouse or a trackball by which the user may provide input to the computer.

Apparatus and methods disclosed herein may be implemented in a computer system that includes a back-end component, such as a data server; or that includes a middleware component, such as an application server or an Internet server; or that includes a front-end component, such as a client computer having a graphical user interface or an Internet browser, or any combination of them. The components of the system may be connected by any form or medium of digital data communication such as a communication network. Examples of communication networks include, e.g., a LAN, a WAN, and the computers and networks forming the Internet.

The computer system may include clients and servers. A client and server are generally remote from each other and typically interact through a network, such as the described one. The relationship of client and server may arise by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of configuring an attribute system and performing a global attribute search, the method comprising:

a) in a system configuration phase:

receiving a first user-actuated input in a distributed computing system that comprises multiple executable software applications, each of which processes data objects having data object identifiers and being stored in the distributed computing system, the data objects having attributes with attribute names and corresponding attribute values that are stored in at least two attribute repositories of an attribute system, the first user-actuated input identifying a first user-selected attribute having a first attribute name, the first user-selected attribute residing in a first attribute repository;

receiving, in the distributed computing system, a second user-actuated input identifying a second user-selected attribute having a second attribute name, the second user-selected attribute being different than the first user-selected attribute and residing in a second attribute repository that is different than the first attribute repository;

receiving, in the distributed computing system, a third user-actuated input that identifies a user-determined alias name that is to correspond to the first and second user-selected attributes; and storing in the attribute system an association between the user-determined alias name and the first and second user-selected attribute names; and b) subsequently in a system usage phase:

receiving query input during execution of a global attribute search in at least two attribute repositories of the distributed computing system, the query input comprising at least one target alias name;

identifying, in response to the query input, at least two attribute names corresponding to the target alias name and at least one data object having an attribute value matching the query input, wherein the identification comprises determining which of the attribute repositories to access to retrieve the at least two attribute names corresponding to the target alias name, the determination made using (i) an attribute registry having a hash table of attributes mapped to the first and second attribute repositories, and (ii) an alias mapping table, wherein the alias mapping table contains associations of the first and second attribute repositories with each other and with the target alias name; and providing output in response to the query input, the output comprising the identified at least two attribute names and the at least one data object having an attribute value matching the query input.

2. The computer-implemented method of claim 1, wherein storing the association between the user-determined alias name and the user-selected attribute name comprises storing the user-determined alias name and the user-selected attribute name in a row of a relational database table.

3. The computer-implemented method of claim 1, wherein storing the association between the user-determined alias name and the user-selected attribute name comprises storing the user-determined alias name as a metadata element of an attribute having an attribute name that corresponds to the user-selected attribute name.

4. The computer-implemented method of claim 1, further comprising displaying a list of alias names during the system configuration phase.

5. The computer-implemented method of claim 4, wherein the third user-actuated input is received in response to the displayed list of alias names.

6. The computer-implemented method of claim 1, wherein the query input further comprises a search value.

7. The computer-implemented method of claim 6, further comprising identifying a data object identifier corresponding to a data object having an attribute that has one of the at least two identified attribute names and that further has an attribute value corresponding to the search value, and wherein the output further comprises the data object identifier.

8. The computer-implemented method of claim 1, wherein the query input is received from one of the multiple executable software applications.

9. A computer program product, tangibly embodied in a computer-readable storage medium, the computer program product comprising instructions that, when executed, cause a processor to perform operations comprising:

a) in a system configuration phase:

receiving a first user-actuated input in a distributed computing system that comprises multiple executable software applications, each of which processes data objects having data object identifiers and being stored in the distributed computing system, the data objects having attributes with attribute names and corresponding attribute values that are stored in at least two attribute repositories of an attribute system, the first user-actuated input identifying a first user-selected attribute having a first attribute name, the first user-selected attribute residing in a first attribute repository;

receiving, in the distributed computing system, a second user-actuated input identifying a second user-selected attribute having a second attribute name, the second user-selected attribute being different than the first user-selected attribute and residing in a second attribute repository that is different than the first attribute repository;

receiving, in the distributed computing system, a third user-actuated input that identifies a user-determined alias name that is to correspond to the first and second user-selected attributes; and storing in the attribute system an association between the user-determined alias name and the first and second user-selected attribute names; and b) subsequently in a system usage phase:

receiving query input during execution of a global attribute search in at least two attribute repositories of the distributed computing system, the query input comprising at least one target alias name;

identifying, in response to the query input, at least two attribute names corresponding to the target alias name and at least one data object having an attribute value matching the query input, wherein the identification comprises determining which of the attribute repositories to access to retrieve the at least two attribute names corresponding to the target alias name, the determination made using (i) an attribute registry having a hash table of attributes mapped to the first and second attribute repositories, and (ii) an alias mapping table, wherein the alias mapping table contains associations of the first and second attribute repositories with each other and with the target alias name; and providing output in response to the query input, the output comprising the identified at least two attribute names and the at least one data object having an attribute value matching the query input.

* * * * *